US012707130B2

(12) United States Patent
Johnson et al.

(10) Patent No.: US 12,707,130 B2
(45) Date of Patent: Aug. 11, 2026

(54) DECODING A VIDEO STREAM WITHIN A BROWSER

(71) Applicant: V-NOVA INTERNATIONAL LIMITED, London (GB)

(72) Inventors: Robert Johnson, London (GB); Guido Meardi, London (GB); Fabio Murra, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 46 days.

(21) Appl. No.: 18/254,367

(22) PCT Filed: Nov. 26, 2021

(86) PCT No.: PCT/GB2021/053078
§ 371 (c)(1),
(2) Date: May 24, 2023

(87) PCT Pub. No.: WO2022/112782
PCT Pub. Date: Jun. 2, 2022

(65) Prior Publication Data

US 2024/0064388 A1 Feb. 22, 2024

(30) Foreign Application Priority Data

Nov. 27, 2020 (GB) .................................... 2018747

(51) Int. Cl.
*H04N 21/218* (2011.01)
*H04N 19/39* (2014.01)
(Continued)

(52) U.S. Cl.
CPC ......... *H04N 21/8173* (2013.01); *H04N 19/39* (2014.11); *H04N 21/234327* (2013.01); *H04N 21/440227* (2013.01); *H04N 21/4884* (2013.01)

(58) Field of Classification Search
None
See application file for complete search history.

(56) References Cited

U.S. PATENT DOCUMENTS

2004/0190876 A1* 9/2004 Chung .................... H04N 5/85
386/E5.064
2008/0052098 A1* 2/2008 Malnati ................. G06Q 10/10
705/321

(Continued)

FOREIGN PATENT DOCUMENTS

CN 107613029 A 1/2018
WO 2020/188273 A1 9/2020

OTHER PUBLICATIONS

International Preliminary Report on Patentability received for PCT Patent Application No. PCT/GB2021/053078, mailed on Jun. 8, 2023, 13 pages.

(Continued)

*Primary Examiner* — Brian T Pendleton
*Assistant Examiner* — Jean D Saint Cyr
(74) *Attorney, Agent, or Firm* — Workman Nydegger

(57) ABSTRACT

Certain examples described herein relate to decoding a video stream within a browser. An encoded multi-layer video stream is received in a source buffer. An encoded base stream is extracted from the source buffer and decoded using a markup video element to obtain a decoded base stream. The decoded base stream is rendered in a first markup video display region, wherein the first markup video display region is hidden. An encoded enhancement stream is extracted from the source buffer and decoded to obtain a decoded enhancement stream. The decoded base stream is obtained from the first markup video display region and combined with the decoded enhancement stream to generate a reconstructed video stream, which is rendered in a second markup video display region that is visible within the browser.

16 Claims, 3 Drawing Sheets

(51) Int. Cl.

| | |
|---|---|
| ***H04N 21/2183*** | (2011.01) |
| ***H04N 21/231*** | (2011.01) |
| ***H04N 21/232*** | (2011.01) |
| ***H04N 21/234*** | (2011.01) |
| ***H04N 21/2343*** | (2011.01) |
| ***H04N 21/258*** | (2011.01) |
| ***H04N 21/418*** | (2011.01) |
| ***H04N 21/432*** | (2011.01) |
| ***H04N 21/44*** | (2011.01) |
| ***H04N 21/4402*** | (2011.01) |
| ***H04N 21/488*** | (2011.01) |
| ***H04N 21/81*** | (2011.01) |

(56) References Cited

U.S. PATENT DOCUMENTS

2014/0003516 A1 1/2014 Soroushian
2021/0385522 A1* 12/2021 Giladi ................ H04N 21/2362

OTHER PUBLICATIONS

International Search Report and Written Opinion received for PCT Patent Application No. PCT/GB2021/053078, mailed on Jul. 11, 2022, 18 pages.

Invitation to Pay Additional Fees received for PCT Patent Application No. PCT/GB2021/053078, mailed on May 18, 2022, 13 pages.

Red5pro, "9 Reasons Why LCEVC Circumvents the Codec Wars," Aug. 18, 2020, Retrieved on https://www.red5pro.com/blog/9-reasons-why-lcevc-circumvents-the-codec-wars/, pp. 4.

Seema. A. et al., "WVSNP-DASH: Name-Based Segmented Video Streaming", IEEE Transactions on Broadcasting, IEEE Service Center, Piscataway, NJ, US, vol. 61, No. 3, Sep. 1, 2015, pp. 346-355.

V-Nova, "HTML5 Integration Guide—V-Nova," Apr. 19, 2021, pp. 10, Retrieved on https://docs.v-nova.com/v-nova/lcevc/integrations/html5-integration.

Office Action received for Chinese Patent Application No. 202180078214.9, mailed on Jul. 31, 2025, 23 pages (12 pages of English Translation and 11 pages of Original Document).

Jung et al., "Outcomes of Exploration Experiments—Summary Report", International Organization for Standardization, ISO/IEC JTC1/SC 29/WG 04, Jan. 2022, pp. 1-18.

Office Action received for GB Patent Application No. 2219351.0, mailed on Dec. 10, 2025, 5 pages.

* cited by examiner

DECODING A VIDEO STREAM WITHIN A BROWSER

CROSS-REFERENCE TO RELATED APPLICATIONS

This application is a 371 US Nationalization of International Application No. PCT/GB2021/053078, filed Nov. 26, 2021, which claims priority to United Kingdom Patent Application No. 2018747.2, filed Nov. 27, 2020, the disclosures of which are hereby incorporated by reference herein in their entirety.

TECHNICAL FIELD

The present invention relates to methods, systems, computer programs and computer-readable media for use in decoding video streams within web browsers.

BACKGROUND

Encoding and decoding of video content is a consideration in many known systems. Video content may be encoded for transmission, for example over a data communications network. When such video content is decoded, it may be desired to increase a level of quality of the video and/or recover as much of the information contained in the original video as possible. Many video coding formats, and their associated codecs, have been developed that attempt to achieve these desired characteristics, but often require significant software updates at the level of an operating system and/or hardware upgrades. Furthermore, to increase the quality of decoded video content, it is typically required to increase the complexity of the encoding and decoding procedures, which can increase power usage and increase the latency with which video content can be delivered.

It may be desirable to embed the video content within a web page for playback by an end user using the World Wide Web. To display video content within a webpage, a media element can be included in a Hypertext Markup Language (HTML) document that embeds a media player into the webpage and through which video content can be played. For example, the latest version of HTML, HTML5, includes a video element to embed video content. However, a browser may be unable to render video content of a particular video coding format.

Red5 Pro, 18 Aug. 2020, "9 Reasons why LCEVC circumvents the Codec wars", Red5 Pro (https.//www.red5pro.com/blog/9-reasons-why-lcevc-circumvents-the-codec-wars) discloses live streaming involving the Low Complexity Enhancement Video Coding (LCEVC) codec. Jan Ozer, Mar. 12, 2020, "How to Encode with LCEVC', Streaming Media, (https://www.streamingmedia.com/Articles/ReadArticle.aspx?ArticleID=139 705) discloses encoding LCEVC. ITU Journal: ICT Discoveries, Vol. 3(1), 8 Jun. 2020; Florian Maurer et al; "Overview of MPEG-5 Part 2—Low Complexity Enhancement Video Coding (LCEVC)" (https://www.itu.int/pub/S-JOURNAL-ICTS.V3I1-2020-12) discloses an outline of the LCEVC encoder and decoder coding structure, tools, and an overview of the performance of LCEVC.

SUMMARY

According to a first aspect of the present disclosure, there is provided a method of decoding a video stream within a browser. The method comprises: receiving, in a source buffer, an encoded multi-layer video stream; extracting an encoded base stream from the source buffer; decoding the encoded base stream using a markup video element to obtain a decoded base stream; rendering the decoded base stream in a first markup video display region, wherein the first markup video display region is hidden; extracting an encoded enhancement stream from the source buffer; decoding the encoded enhancement stream to obtain a decoded enhancement stream; obtaining the decoded base stream from the first markup video display region; combining the decoded base stream with the decoded enhancement stream to generate a reconstructed video stream; and rendering the reconstructed video stream in a second markup video display region that is visible within the browser.

According to a second aspect of the present disclosure, there is provided a decoder for decoding a video stream within a browser. The decoder is configured to: obtain an encoded enhancement stream of an encoded multi-layer video stream from a source buffer; decode the encoded enhancement stream to obtain a decoded enhancement stream; obtain a decoded base stream of the encoded multi-layer video from a first markup video display region, wherein the first markup video display region is hidden; and combine the decoded base stream with the decoded enhancement stream to generate a reconstructed video stream for rending in a second markup video display region that is visible within the browser.

According to a third aspect of the present disclosure, there is provided a browser comprising the decoder of the second aspect.

According to a fourth aspect of the present disclosure, there is provided a method of decoding a video stream within a browser. The method comprises: receiving, at a client device comprising an operating system and a browser, an encoded multi-layer video stream; determining whether at least one of: the operating system comprises an operating system video decoding function for decoding the encoded multi-layer video stream or the browser comprises a browser video decoding function for decoding the encoded multi-layer video stream; and responsive to a negative determination, decoding the encoded multi-layer video stream within the browser of the client device, using a script-based decoding function.

According to a fifth aspect of the present disclosure, there is provided a computer-readable storage medium storing instructions executable by at least one processor to perform the method of any of the first and fourth aspects.

Further features will become apparent from the following description, given by way of example only, which is made with reference to the accompanying drawings.

DETAILED DESCRIPTION

Encoding of a digital signal, also known as compression, is the process of generating a representation of the digital signal using fewer bits of information than is used to represent the original signal, e.g. an original video. The encoding process may be described as lossy when information is lost between the original signal and in the generated representation. Alternatively, the encoding process may be described as lossless when no information is lost between the original signal and in the generated representation. Unencoded digital signals, e.g. representing video content, require a high rate of data transmission and so are often encoded.

In the encoding and decoding of digital video content, there is typically a trade-off between increased video quality and encoding and decoding complexity. However, with the advent of MPEG-5 Part 2 Low Complexity Enhancement Video Encoding (LCEVC), details of which can be found in WO/2020/188273A1, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020, which are incorporated herein by reference, it is now possible to improve video quality and reduce complexity of the codec. This is achieved by combining a base stream encoded using a base codec (e.g. Advanced Video Coding (AVC), High Efficiency Video Coding (HEVC), or any other present or future codec), with an encoded enhancement stream comprising at least one enhancement level of coded data.

Combining the encoded base stream with the encoded enhancement stream allows the encoded base stream to be transmitted at a lower resolution, reducing bandwidth requirements on a data communications network. Alternatively, the video content can be transmitted at a higher resolution for the same bandwidth to produce a higher quality video than is possible without combining with an enhancement level.

Figure 1:
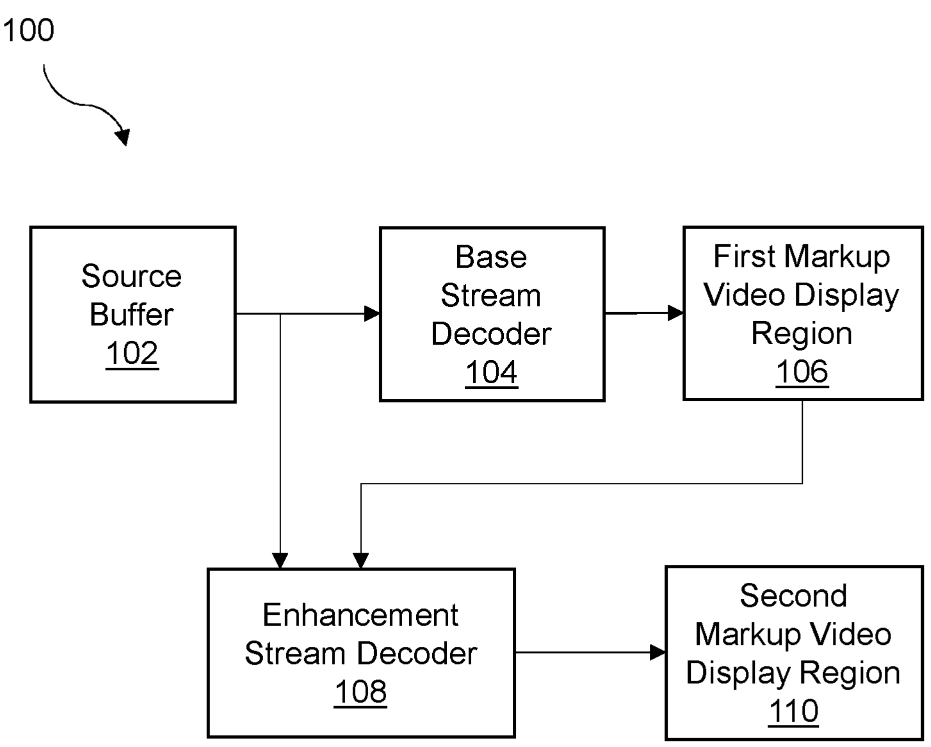
FIG. 1 is a schematic diagram of a system according to an example.

FIG. 1 is a schematic diagram of an example system 100 for decoding an encoded multi-layer video stream, such as an encoded multi-layer video stream encoded using LCEVC. The system 100 may be implemented within a browser, for example. The browser may be any browser capable of accessing information on the World Wide Web, examples of which include, but are not limited to, Google Chrome®, Microsoft Edge®, Safari®, Firefox® and Opera®. The browser may be implemented in a client device. Example client devices include, but are not limited to, mobile devices, computing devices, tablet devices, smart televisions, and so on. The client device comprises an operating system (OS) and the OS comprises the browser.

One function of the browser is to transform documents written in a markup scripting language (sometimes referred to as a markup language) into a visual representation of a webpage. The markup scripting language is used to control a display of data in a rendered webpage. The markup language may include a markup video element which in turn becomes a video display region when processed by the browser. For example, a user of the browser may navigate to a web page that includes an embedded video. When the browser renders the webpage, it receives data corresponding to the video. The browser may include resources necessary to decode and playback the video, so as to display the video to the user within a video display region rendered by the browser on a display of a client device, for example. Examples of a markup scripting language include any versions of Hypertext Markup Language (HTML), such as HTML5, and Extensible HyperText Markup Language (XHTML).

The markup video element, for example, indicates properties associated with display of the video in the webpage, for example the size of the video within the webpage and whether the video will autoplay upon loading of the webpage. The markup video element, for example, also includes an indication of the video coding format used to encode the video. This indicates to the browser which decoder(s) to use to decode the encoded video. The browser may then perform a call to at least one of a decoding function within the resources of the browser itself (which may be considered browser-native resources, which are native to the browser), or to a decoding function implemented in the OS, as discussed further below.

The system 100 of FIG. 1 comprises a source buffer 102 to receive an encoded multi-layer video stream. The source buffer is a section of memory, which is for example accessible to the browser. The source buffer may be a Media Source Extensions (MSE) application programming interface (API) SourceBuffer, for example. The encoded multi-layer video stream in this example comprises an encoded base stream and an encoded enhancement stream. The encoded base stream comprises video content encoded by any base encoder, also known as a compressor, such as an Advanced Video Coding (AVC), High Efficiency Video Coding (HEVC), VP9, MPEG-5 Essential Video Coding (EVC), or AOMedia Video 1 (AV1) encoder.

The system 100 further comprises a base stream decoder 104, also known as a base stream decompressor. The encoded base stream is extracted from the source buffer 102 and decoded by the base stream decoder 104 using a markup video element. The markup video element provides an interface between the markup language and decoding resources. HTML5, for example, includes a markup video element that can be used to embed video content in a webpage. Another example is a JavaScript library that builds a custom set of controls over top of the HTML5 video element, which may be considered to function as a JavaScript player. It is to be appreciated that a markup video element such as the HTML5 video element can be modified by adding additional resources, such as a multi-layer video stream decoding library, a WebAssembly decoding library and/or a web worker function that can be accessed by the markup video element. In a case, where LCEVC is used, the enhancement stream may be carried within a set of Supplemental Enhancement Information (SEI) messages that accompany and are associated with the base stream. Base stream decoders are often configured to ignore these messages if they contain information they cannot interpret. Hence, in this case, the base stream decoder 104 may retrieve data relating to the base stream from the source buffer 102 in a default manner, wherein both enhanced and non-enhanced base streams are processed in a common manner. In this case, the base stream decoder 104 may ignore SEI messages that carry the enhancement stream that reside within the source buffer 102.

In the example system 100 of FIG. 1, the markup video element includes an indication to the video coding format associated with the encoded base stream. The markup video element, when processed by the browser, locates the appropriate base stream decoder associated with the video coding format, and decodes the encoded base stream. The base stream decoder 104 may be implemented within the browser, using functionality of the OS of a client device comprising the browser, or utilising resources of both the browser and the OS. For example, the OS may utilise hardware acceleration to decode the encoded base stream which can reduce power consumption and the number of computations performed by a CPU compared to software-only decoding.

The decoded base stream is rendered in a first markup video display region 106. The first markup video display region 106, for example, corresponds to a region of the webpage at which it is desired to display a video. The rendering of the decoded base stream allows access to the base stream video data, e.g. decoded frames of the base encoded video. By rendering the base stream video data, the base stream video data is accessible to other decoding processes within the browser, e.g. even if the decoding of the base stream is performed by an inaccessible or protected method. The rendered decoded base stream is subsequently combined with a decoded enhancement stream to generate a reconstructed video stream. However, the rendered base stream does not include enhancement data from the enhancement stream at this point, so the markup video display region is hidden. This ensures that the rendered video content corresponding to the base stream is not displayed in the webpage and so is not visible to a viewer of the webpage. Rendering the decoded base stream also ensures that the system 100 can still decode and render video streams that are not encoded using a multi-layer video coding format, e.g. if this is the case, the markup video display region may be set as visible and the decoded base stream may be displayed as per comparative non-enhancement video rendering. For example, if the webpage included a single-layer video stream that lacked an enhancement stream, the system 100 of FIG. 1 could be used to display the decoded single-layer video stream, e.g. by unhiding the first markup video display region 106.

The system 100 further comprises an enhancement stream decoder 108. The encoded enhancement stream is extracted from the source buffer 102 and decoded by the enhancement stream decoder 108. For example, the enhancement stream decoder 108 may retrieve the encoded enhancement stream from data for a set of SEI messages that is stored within the source buffer 102. The enhancement stream decoder 108 also obtains the decoded base stream from the first markup video display region 106 and combines the decoded base stream with the decoded enhancement stream to generate a reconstructed video stream. For example, using a JavaScript player, obtaining the decoded base stream can be performed using a requestAnimationFrame API that extracts a video frame of the decoded base stream, as it is rendered, from the first video markup display region 106. The reconstructed video stream may then be rendered in a second markup video display region 110 within the webpage that is visible to a viewer of the webpage.

The enhancement stream decoder 108 may be a multi-layer video stream decoder plugin (DPI) such as an LCEVC decoder plugin, configured to decode an LCEVC-encoded video stream.

One or more components of the system 100 may be implemented in a browser. In one example, a browser is provided comprising the enhancement stream decoder 108.

Example processes by which an encoded multi-layer video stream is decoded and rendered within a webpage will now be described in further detail with respect to the methods 200 and 300 of FIGS. 2 and 3.

Figure 2:
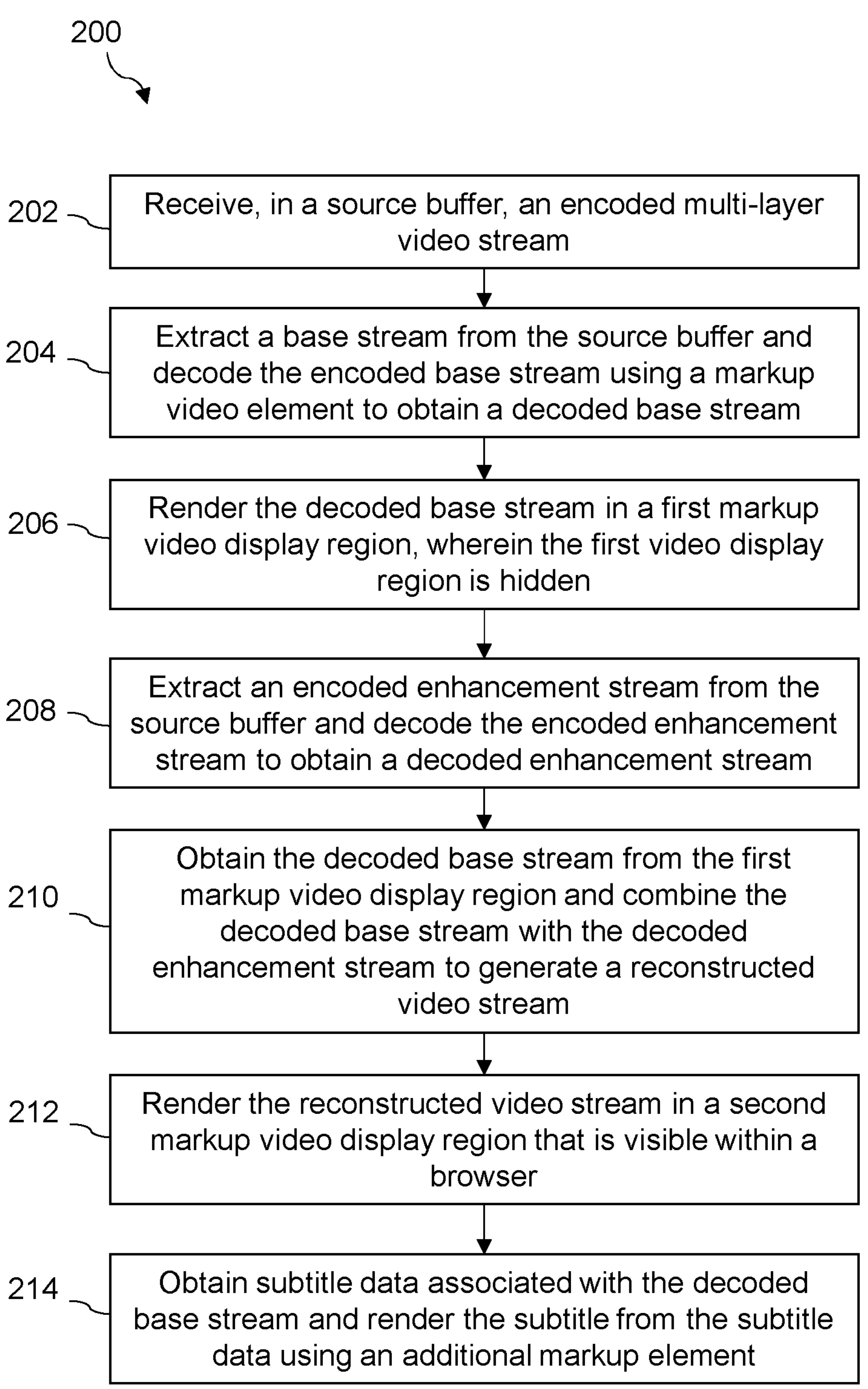
FIG. 2 is a flow diagram of a first method of decoding a video stream within a browser according to examples.
Figure 3:
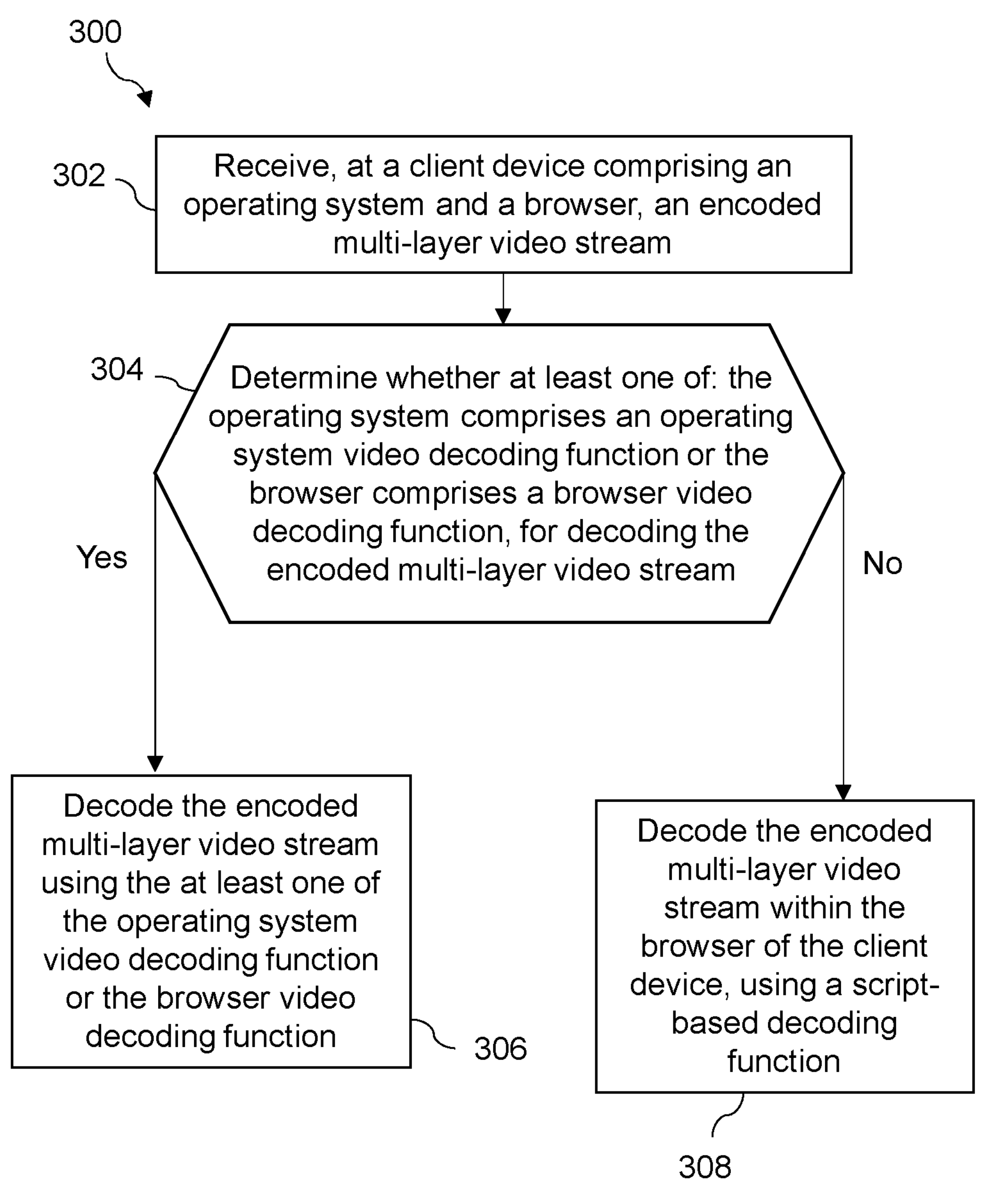
FIG. 3 is a flow diagram of a second method of decoding a video stream within a browser according to further examples.

FIG. 2 is a flow diagram of a method 200 for decoding a video stream within a browser. As discussed above, the browser may be any browser that processes documents in a markup scripting language to generate a visual representation of a webpage. The visual representation of the webpage may be made visible through a user interface associated with a client device associated with the browser.

At block 202 of FIG. 2, an encoded multi-layer video stream is received in a source buffer, such as in the source buffer 102 in FIG. 1. The encoded multi-layer video stream comprises an encoded base stream and an encoded enhancement stream.

The encoded base stream may be a down-sampled source signal encoded using a base encoder or codec, and decodable by a decoder, such as a hardware-based decoder. The base encoder or codec can be any base encoder or codec, such as Advanced Video Coding (AVC), High Efficiency Video Coding (HEVC), VP9, MPEG-5 Essential Video Coding (EVC), and AOMedia Video 1 (AV1) encoders and codecs. Using existing base encoders and codecs as part of the encoding (and decoding) procedure ensures that systems that are not capable of rendering multi-layer video content may still decode the base stream using the existing base codec. This means that no updates to hardware are required to decode the encoded multi-layer video stream using the method 200, and future base codecs may also be used without further hardware upgrades, should the hardware of a system be upgraded to become compatible with the future base codec.

In some examples, the encoded enhancement stream comprises an encoded set of residuals which correct or enhance the base stream. There may be multiple levels of enhancement data in a hierarchical structure. The encoded enhancement stream may be encoded using a dedicated encoder configured to generate an encoded enhancement stream from uncompressed full resolution video.

An LCEVC-enhanced stream is an example of such a video stream encoded using the multi-layer coding scheme. In this case, the video stream may be encoded by an LCEVC encoder. Other examples are also envisaged, though.

At block 204 of FIG. 2, the encoded base stream is extracted from the source buffer and decoded using a markup video element. The markup video element may be an element of a markup scripting language, such as HTML and XHTML. Then, encoded base stream may be decoded using a suitable decoder, such as the base stream decoder 104. The markup video element receives or otherwise obtains an indication of the video coding format of the encoded base stream. When processed by the browser, the markup video element locates a decoder, or codec, associated with the video coding format and causes the encoded base stream to be decoded by the decoder. HTML5, for example, includes a <video> element within the markup language to embed video content in a webpage, which is an example of a markup video element. The base decoder is any decoder capable of decoding the encoded base stream, such as the base stream decoder 104 shown in FIG. 1.

The decoded base stream comprises a plurality of individual frames. A frame, for example, corresponds to a still image or picture. In some examples, a video is composed of a series of frames. A frame may include a plurality of pixels. Each frame comprises data representing properties of the video content. For example, a frame may comprise data defining the colour of each pixel in the frame. This data can be used by the markup video element to form a visual representation of the video stream when rendered in the final webpage.

At block 206 of FIG. 2, the decoded base stream is rendered in a first markup video display region, which is hidden. The browser for example processes the markup video element corresponding to a markup video display region in the generated webpage by embedding a media player in the webpage and rendering the video content in the media player. The first video display region is hidden so that a representation of this region is not displayed on the rendered webpage. This ensures that the unenhanced video content is not displayed, and no duplicate video content is visible in the webpage once the base and enhancement streams are combined and rendered.

The first markup video display region may be defined in the markup scripting language.

At block 208, the enhancement stream is extracted from the source buffer and decoded. The enhancement stream comprises the enhancement data associated with one or more enhancement layers of the multi-layer video stream. The enhancement stream may be decoded by a multi-layer video stream DPI such as the enhancement stream decoder 108 shown in FIG. 1.

At block 210, the decoded base stream is obtained from the first markup video display region and combined with the decoded enhancement stream to generate a reconstructed video stream. The markup video element may comprise a call to an object block to initialise the combining of the decoded base stream with the decoded enhancement stream to generate the reconstructed video stream. The object block for example includes configuration data to configure the combining of the decoded base stream with the decoded enhancement stream to generate the reconstructed video stream, and may, e.g., indicate various parameters particular to the coding scheme used to encode the multi-layer video stream. The decoded base and enhancement streams may be combined by the multi-layer video stream DPI. The multi-layer video stream DPI extracts a frame from the first markup video display region and combines the frame from the first markup video display region with a corresponding frame of the decoded enhancement stream. For example, using a JavaScript player, each frame of the base stream can be obtained using a requestAnimationFrame API, as described above. The resulting stream of combined frames constitutes the reconstructed video stream.

At block 212, the reconstructed video stream is rendered in a second markup video display region that is visible within the browser. The multi-layer video stream DPI may render the reconstructed video stream. The second markup video display region may overlap the first markup video display region. When this is the case, the second markup video display region may match a screen size and page position of the first markup video display region.

In the case of HTML, the second markup video display region is a canvas element in some examples.

The method 200 of FIG. 2 for example allows for high quality playback of video content within a web browser, using a low complexity decoding procedure that can be integrated with existing decoders already utilised by the browser.

Subtitles are sometimes utilised to describe and/or transcribe audio content within video and may be generated and rendered by the markup video element in the first markup display region. However, this region is hidden in the method 200 of FIG. 2. The method of FIG. 2 therefore further comprises obtaining, at block 214, subtitle data associated with the decoded base stream and rendering the subtitle from the subtitle data using a further markup element. The subtitle data may be included within the encoded multi-layer video stream, in which case the subtitle data can be extracted from the source buffer. Alternatively, the subtitle data may be determined in real time using automatic captioning procedures such as speech to text. The obtained subtitle data may then be rendered within the webpage using a further markup element, with the location and visibility of the subtitles controlled by a media player. In HTML5, for example, the further markup element may be a HTMLDivElement. The position and visibility of the HTMLDivElement may be controlled by a media player called by the markup video element, since properties of the second markup video region may correspond to or otherwise match properties of the first markup video region. It is to be appreciated, however, that the method 200 of FIG. 2 may be performed without block 214, for example where the video stream lacks subtitles.

To ensure that it is possible to render the multi-layer video stream, the method may also include detecting the capability of at least one of the browser and OS comprising the browser of decoding the encoded enhancement stream (i.e. whether the browser and/or the OS are capable of decoding the encoded enhancement stream). To do this, the markup video element may include at least one query to detect whether the system for performing the decoding is actually capable of decoding encoded multi-layer video streams such as LCEVC-enhanced content.

The method may therefore further include detecting one of at least a supported browser and browser version. If it is determined that the browser is not compatible with decoding encoded multi-layer video streams, text may be displayed on the webpage indicating that the browser is not supported. The text may also include an indication of which browsers are currently supported. Alternatively, if the browser is supported, but is running an older version without multi-layer video stream decoding compatibility, text may be displayed informing a user to upgrade the browser in order to view the content.

The method may include detecting the OS to ensure the supported browser for the OS is being used. If it is determined that the browser being used is not supported by the OS, then text indicating this may be displayed on the webpage. The text may instruct a user to use a supported browser in order to view the video content. Otherwise, if it is determined that the browser being used is supported by the OS, then the method 200 may proceed.

The method may further detect whether certain resources are available, such as WebGL 1.0 and Web Workers when the markup language is HTML5. WebGL 1.0 is a JavaScript API for rendering 2 and 3-dimensional graphics in a web browser, while a web worker is a JavaScript API that runs in the background of a web browser that can perform tasks without interfering with a user interface. To detect an instance of WebGL 1.0, the markup may include a call to create a canvas element and examine the context of WebGL 1.0 within the canvas element. The canvas element need not be added to the document structuring the webpage, instead only existing in the background to determine WebGL 1.0 capabilities. This ensures that the canvas element is not displayed in the generated webpage.

If it is determined that a system is compatible, then the system may proceed to decode and render the video content, for example using the method 200 of FIG. 2.

In some cases, decoding the enhancement stream uses a function call to at least one of an operating system-implemented decoding resource, and a browser-implemented decoding resource. That is, the operating system and/or the browser may comprise the appropriate decoding resources (which may be considered native resources) to decode the enhancement stream without modifications to the markup video element.

On the other hand, the markup video element may be modified in order to decode encoded multi-layer video streams. In an example, the markup video element may be a JavaScript player. An example JavaScript player is a Hypertext Transfer Protocol (HTTP) Live Streaming (HLS) player which provides a JavaScript library that implements an HTTP live streaming client on top of an HTML video element. The method 200 can be implemented into an existing media player, such as the HLS.js player, by including additional resources. For example, decoding the encoded enhancement stream may use at least one of: a JavaScript library, or a WebAssembly library. In some cases, a web worker function to extract metadata from the encoded multi-layer video stream for use in generating the reconstructed video stream may additionally or alternatively be used. In such cases, the HLS.js player may be modified to include at least one of a multi-layer video stream library (which is for example a JavaScript library), a multi-layer video stream WebAssembly library, and a web worker function. In such cases, the HLS.js markup video element is modified to include the additional components of method 200 in FIG. 2. For example, when the multi-layer video stream is an LCEVC video stream, the markup video element may be modified from hls.attachMedia(video)

to hls.attachMedia(video, canvas, subtitles, lcevcConfig).

Here, video is an HTML <video> element for decoding and rendering the encoded base stream in a first markup video display region, canvas is an HTML <canvas> element for displaying the rendered frames of the reconstructed video stream in a second markup video display region, subtitles is an HTMLDivElement used to display subtitles, and lcevcConfig is an object block comprising settings with which LECVC decoding is initialised.

A further method 300 of decoding a video stream within a browser will now be described with reference to FIG. 3. The method 200 of FIG. 2 is a markup scripting language implementation of decoding encoded multi-layer video streams which can be deployed across a browser that has access to readily available libraries, such as various JavaScript libraries, WebAssembly libraries, web workers etc. However, in some cases, the underlying operating system comprising the browser may include native support for decoding and rendering encoded multi-layer video streams.

At block 302, a client device comprising an operating system and a browser, receives an encoded multi-layer video stream. The encoded multi-layer video stream comprises an encoded base stream and an encoded enhancement stream.

At block 304, it is determined whether at least one of: the operating system comprises an operating system video decoding function for decoding the encoded multi-layer video stream or the browser comprises a browser video decoding function for decoding the encoded multi-layer video stream. This may involve searching within the operating system and/or browser for resources capable of decoding and rendering encoded multi-layer video streams.

If it is determined that the operating system does not comprise an operating system decoding function for decoding the encoded multi-layer video stream and the browser does not comprise a browser video decoding function for decoding the encoded multi-layer video stream, then the method 300 proceeds to block 308, where the encoded multi-layer video stream is decoded and rendered using a script-based decoding function, such as that described in the method 200 above.

On the other hand, if it is determined that the operating system comprises an operating system decoding function for decoding the encoded multi-layer video stream and/or the browser comprises a browser video decoding function for decoding the encoded multi-layer video stream, then the method 300 proceeds to block 306, where the encoded multi-layer video stream is decoded using the at least one of the operating system video decoding function or the browser video decoding function. The method 300 provides a robust procedure for decoding encoded multi-layer video streams that can take advantage of native decoding capabilities of at least one of the operating system or the browser, if they exist, or else use a script-based decoding function for decoding the encoded multi-layer video stream.

The methods 200 and 300 may be carried out within the system 100, although other examples are possible. The methods 200 and 300 may also be performed by a processor executing instructions stored on one or more computer-readable storage media.

The above embodiments are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method of decoding a video stream within a browser, the method comprising:

receiving, in a source buffer, an encoded multi-layer video stream, which includes an encoded base stream and an encoded enhancement stream, wherein a combination of the encoded base stream and the encoded enhancement stream are usable to reconstruct an original video stream;

extracting the encoded base stream from the source buffer;

decoding the encoded base stream using a markup video element to obtain a decoded base stream;

rendering the decoded base stream in a first markup video display region, wherein the first markup video display region is hidden, the rendering being performed to expose decoded base stream video data to an enhancement stream decoder operating within the browser;

extracting the encoded enhancement stream from the source buffer;

decoding the encoded enhancement stream to obtain a decoded enhancement stream;

causing the enhancement stream decoder to obtain the decoded base stream from the first markup video display region by extracting video frames of the decoded base stream as the video frames are rendered in the hidden first markup video display region;

combining the decoded base stream obtained from the hidden first markup video display region with the decoded enhancement stream to generate a reconstructed video stream; and rendering the reconstructed video stream in a second markup video display region that is visible within the browser.

2. The method according to claim 1, wherein the encoded multi-layer video stream is a Low Complexity Enhancement Video Coding (LCEVC)-encoded video stream.

3. The method according to claim 1, wherein the markup video element, the first markup video display region, and the second markup video display region are each Hypertext Markup Language (HTML) elements, respectively.

4. The method according to claim 3, wherein the second markup video display region is an HTML canvas element.

5. The method according to claim 1, further comprising:
obtaining subtitle data associated with the encoded multi-layer video stream; and
rendering subtitles based on the subtitle data using a further additional markup element.

6. The method according to claim 1, wherein the rendering of the decoded base stream uses a function call to at least one of:
an operating-system-implemented decoding resource; and
a browser-implemented decoding resource.

7. The method according to claim 1, wherein the decoding the encoded enhancement stream comprises using at least one of a JavaScript library or a WebAssembly library.

8. The method according to claim 1, wherein the markup video element comprises a JavaScript player.

9. The method according to claim 1, comprising using a web worker function to extract metadata from the encoded multi-layer video stream for use in generating the reconstructed video stream.

10. The method according to claim 1, wherein the second markup video display region overlaps the first markup video display region.

11. The method according to claim 1, further comprising, before generating the reconstructed video stream, detecting a capability of decoding the encoded enhancement stream of at least one of: the browser and an operating system of a client device comprising the browser.

12. A decoder for decoding a video stream within a browser, the decoder configured to:
obtain an encoded multi-layer video stream, which includes an encoded base stream and an encoded enhancement stream, from a source buffer, wherein a combination of the encoded base stream and the encoded enhancement stream are usable to reconstruct an original video stream;
decode the encoded enhancement stream to obtain a decoded enhancement stream;
obtain the decoded base stream of the encoded multi-layer video from a first markup video display region, wherein the first markup video display region is hidden, the decoded base stream being rendered in the first markup video display region to allow access to decoded base stream video data by the decoder, which is operating within the browser, wherein obtaining the decoded base stream is performed by extracting video frames of the decoded base stream as the video frames are rendered in the hidden first markup video display region; and
combine the decoded base stream obtained from the hidden first markup video display region with the decoded enhancement stream to generate a reconstructed video stream for rending in a second markup video display region that is visible within the browser.

13. The decoder of claim 12, wherein the encoded multi-layer video stream is a Low Complexity Enhancement Video Coding (LCEVC)-encoded stream.

14. The decoder of claim 12, wherein the decoder is a plug-in to the browser.

15. A browser comprising the decoder of claim 12.

16. A non-transitory computer-readable storage medium storing instructions executable by at least one processor to perform the method of claim 1.

* * * * *